(12) United States Patent
Rijckaert

(10) Patent No.: US 6,456,781 B1
(45) Date of Patent: Sep. 24, 2002

(54) RECORDING AND REPRODUCTION OF A FIRST SIGNAL WITH A FIRST BIT-RATE AND A SECOND INFORMATION SIGNAL WITH A SECOND BIT-RATE LARGER THAN THE FIRST BIT-RATE

(75) Inventor: Albert M. A. Rijckaert, Eindhoven (NL)

(73) Assignee: Koninklijke Philips Electronics, N. V. (NL)

( * ) Notice: Subject to any disclaimer, the term of this patent is extended or adjusted under 35 U.S.C. 154(b) by 0 days.

(21) Appl. No.: 09/200,116

(22) Filed: Nov. 25, 1998

(30) Foreign Application Priority Data

Nov. 28, 1997 (EP) .............................................. 97203725

(51) Int. Cl.[7] .............................. H04N 7/08; H04N 7/26; H04N 5/91
(52) U.S. Cl. ............................. 386/92; 386/109; 386/129
(58) Field of Search ............................. 386/92, 109, 111, 386/112, 27, 33, 46, 129, 1, 23, 37, 80, 123, 124; 360/32; H04N 7/08, 7/26, 5/91

(56) References Cited

U.S. PATENT DOCUMENTS

| | | | |
|---|---|---|---|
| 4,963,991 A | * 10/1990 | Honjo | |
| 5,065,259 A | * 11/1991 | Kubota et al. | |
| 5,335,116 A | * 8/1994 | Onishi et al. | |
| 5,412,515 A | 5/1995 | Rijckaert et al. | 360/48 |
| 5,495,369 A | 2/1996 | Rijckaert et al. | 360/48 |
| 5,579,183 A | 11/1996 | Van Gestel et al. | 360/48 |
| 5,937,137 A | 8/1999 | Traxlmayr | 386/96 |
| 5,953,483 A | 9/1999 | Van Gestel et al. | 386/65 |
| 6,055,358 A | 4/2000 | Traxlmayr | 386/96 |
| 6,222,981 B1 | 4/2001 | Rijckaert | 386/68 |
| 6,246,830 B1 | 6/2001 | Traxlmayr | 386/96 |

FOREIGN PATENT DOCUMENTS

EP  0667715 A2  8/1995  .......... H04N/5/926

* cited by examiner

Primary Examiner—Robert Chevalier
(74) Attorney, Agent, or Firm—Edward W. Goodman (57) ABSTRACT

A recording apparatus records a first and a second information signal in a first and a second recording mode, respectively. The apparatus uses two substantially identical processing units (12,22) for processing the information so as to obtain a signal suitable for recording. Further, a reproducing apparatus reproduces the signals recorded with the recording apparatus.

17 Claims, 4 Drawing Sheets

RECORDING AND REPRODUCTION OF A FIRST SIGNAL WITH A FIRST BIT-RATE AND A SECOND INFORMATION SIGNAL WITH A SECOND BIT-RATE LARGER THAN THE FIRST BIT-RATE

BACKGROUND OF THE INVENTION

1. Field of the Invention

The invention relates to an apparatus for recording a first information signal with a first bit-rate and a second information signal with a second bit-rate, which is larger than the first bit-rate, to an apparatus for reproducing the first and the second information signal, and to a method for recording the first and the second information signal.

As an example, the first information signal can be in the form of an SD (standard definition) video signal and the second information signal can be in the form of an HD (high definition) video signal. The SD and HD video signal could have been incorporated into a first and a second MPEG transport stream, respectively, for recording the first and second MPEG transport streams on the record carrier. The first and second information signals can also be in the form of data signals having first and second bit-rates that could have been incorporated in first and second MPEG transport streams.

2. Description of the Related Art

An apparatus for recording an information signal in slant tracks on a record carrier is described in U.S. Pat. Nos. 5,937,137, 6,055,358 and 6,246,830 corresponding to published International Patent Application No. WO 96/06426 (PHO 94.513), documents D1 in the List Of Related Documents. The apparatus is meant to record an analog video signal in accordance with the VHS recording format on the record carrier, and is capable of recording a digital video signal on the record carrier.

SUMMARY OF THE INVENTION

An object of the invention is to provide a simplified apparatus for recording the first and second information signals in the first and second recording modes, respectively. The apparatus for recording a first information signal with a first bit-rate in a first recording mode or a second information signal with a second bit-rate in a second recording mode, so as to produce slant tracks on a magnetic record carrier, comprises:

input means for receiving the first or the second information signal, processing means for processing the first or the second information signal so as to produce a processed first or second information signal, respectively, writing means for writing the processed first or second information signal in said first and second recording modes, respectively, so as to produce said slant tracks, and transporting means for transporting the record carrier with a first or a second record carrier speed in said first and second recording modes, respectively, the second record carrier speed being larger than the first record carrier speed, and the second bit-rate being higher than the first bit-rate, the processing means comprising first and second processing units and a multiplexer unit, the first processing unit being adapted to process the first information signal in said first recording mode so as to obtain said processed first information signal for recording, the multiplexer unit being adapted to multiplex the second information signal into a first signal component and a second signal component in said second recording mode, the first processing unit being adapted to process the first signal component into a processed first signal component in said second recording mode, the second processing unit being adapted to process the second signal component into a processed second signal component in said second recording mode, wherein the writing means comprises at least one pair of a first and a second write head, having azimuth angles substantially equal to +α and −α, respectively, and at least one pair of a third and a fourth write head having azimuth angles substantially equal to +β and −β, respectively, the writing means being adapted to write, in said first recording mode, the processed first information signal on said record carrier using said at least one pair of the first and second write heads, the writing means further being adapted to write, in said second recording mode, said processed first signal component on said record carrier using said at least one pair of the first and second write head and to write said processed second signal component on said record carrier using said at least one pair of the third and fourth write head, and wherein α and β are unequal to each other.

The invention is based on the following recognition. For recording the second information signal, a larger bit-rate is required than for recording the first information signal. A recording apparatus for recording the first information signal is thus generally not capable of recording the second information signal unless special measures are taken. One solution is to increase the record carrier transport speed and add heads to the rotating head drum. Reference is made in this respect to U.S. Pat. Nos. 5,412,515 and 5,495,369, corresponding to European Patent Application No. EP 346,973 (PHN 12.599), documents D2 in the List Of Related Documents. Further, in order to process the second information signal so as to enable recording on the record carrier, it is required to increase the clock frequency of the processing electronics. This may not always be possible.

In the further discussion, it will be assumed that the second information signal is an HD video signal that has such an information bit-rate that it requires, at maximum, a recording bit-rate which is twice the recording bit-rate for recording the first information signal. It should, however, be noted that this is not an essential requirement. The present invention offers a solution to the above problem that it is not always possible to increase the clock frequency for the processing electronics. In accordance with the invention, in the second recording mode, the incoming HD video signal is split into two separate datastreams, and each datastream is processed by a separate processing unit that is normally available for processing the SD video signal. Both processing units can now run at a clock frequency which is the same as in the first recording mode. This offers a simplified apparatus for recording both the first information signal and the second information signal.

BRIEF DESCRIPTION OF THE DRAWINGS

These and other objects of the invention will be described in more detail hereafter, in which.

DESCRIPTION OF THE PREFERRED EMBODIMENTS

Figure 1:
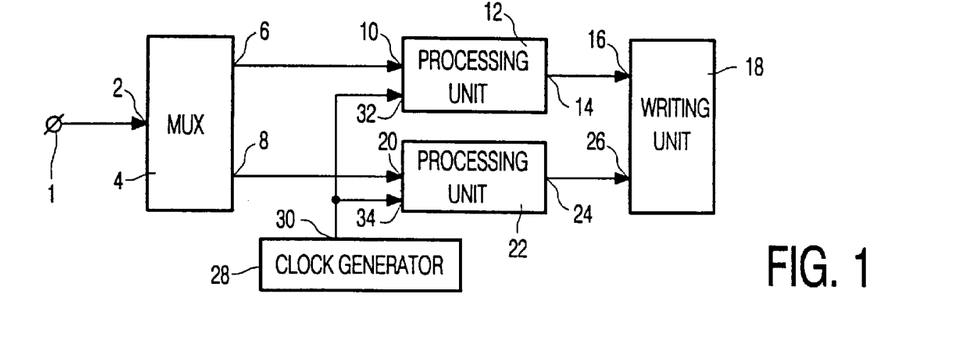
FIG. 1 shows a first embodiment of the recording apparatus.

FIG. 1 shows an embodiment of a recording apparatus for recording an SD video signal and an HD video signal. The apparatus has an input terminal 1 for receiving the SD video signal or the HD video signal. The input terminal 1 is coupled to an input 2 of a multiplexer unit 4, this multiplexer unit being provided with a first and a second output 6 and 8, respectively. The first output 6 is coupled to an input 10 of a first processing unit 12 having an output 14 coupled to an input 16 of a writing unit 18. The second output 8 of the multiplexer unit 4 is coupled to an input 20 of a second processing unit 22 having an output 24 coupled to an input 26 of the writing unit 18. The apparatus further comprises a clock signal generator 28 having an output 30 coupled to clock inputs 32 and 34 of the first and second processing units 12 and 22, respectively.

Figure 2:
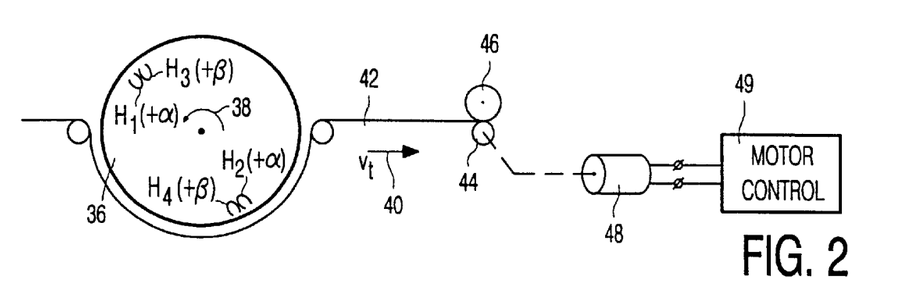
FIG. 2 shows the head drum of the recording apparatus of FIG. 1.

The writing unit 18 comprises a rotatable head drum, an embodiment of which is shown in FIG. 2. The head drum 36 has four heads positioned at its circumference, a first head $H_1$, having a head gap with an azimuth angle $+\alpha$, where $\alpha$ can have a value such as 30°, a second head $H_2$, having a head gap with an azimuth angle $-\alpha$, a third head $H_3$, having a head gap with an azimuth angle $+\beta$, where $\beta$ can have a value of $+6°$ and a fourth head $H_4$, having a head gap with an azimuth angle $-\beta$. The heads $H_1$ and $H_2$ are located diametrically opposite to each other at the periphery of the head drum. In the same way, the heads $H_3$ and $H_4$ are located diametrically opposite to each other at the periphery of the head drum 36. The arrow 38 denotes the direction of rotation of the head drum 36 and the arrow 40 denotes the direction of transport of the record carrier 42. The record carrier 42 is wrapped around the head drum 36 over slightly more than 180°. The heads $H_1$ and $H_3$ are located on the head drum with a relative height difference equal to one track pitch. The heads $H_2$ and $H_4$ are also located on the head drum with a relative height difference equal to one track pitch. The heads $H_1$ and $H_2$ are located at the same height and also the heads $H_3$ and $H_4$ are located at the same height. As a result, subsequent tracks will be written in the second recording mode by the heads $H_1$, $H_3$, $H_2$ and $H_4$. It should further be noted that, in another embodiment of the head drum, the two heads $H_3$ and $H_4$ could have been interchanged.

FIG. 2 further shows a capstan 44 and a pressure roller 46 between which the record carrier is pressed so as to transport the record carrier with a certain velocity. The capstan is rotated by means of a capstan motor 48, which is controlled by a motor control unit 49.

Figure 3:
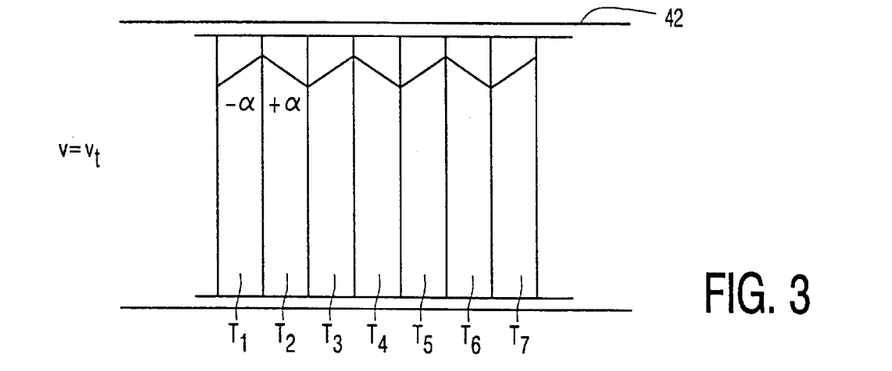
FIG. 3 shows the track pattern on the record carrier obtained with the recording apparatus switched into the first recording mode.

In a first recording mode, an SD video signal is recorded on the record carrier 42. In this recording mode, the processing unit 22 is disabled and also part of the writing unit 18 is disabled. The record carrier is transported by a record carrier transport unit (not shown) with a velocity of $v_t$, and the rotatable head drum 36 is rotated with a predetermined rotational velocity. In the first recording mode, the multiplexer unit 4 is controlled in such a way that an SD video signal received via the input 1 is supplied to the input 10 of the first processing unit 12. The first processing unit 12 processes the SD video signal in a well-known way. When the SD video signal is supplied in the form of MPEG packets in an MPEG transport stream, time stamps are added to the packets, an error correction encoding and a channel encoding is carried out on the SD video signal so as to obtain a processed SD video signal which is suitable for recording on the record carrier. FIG. 3 shows the record carrier 42 obtained after having recorded the processed SD video signal in the first recording mode. FIG. 3 is only a schematic drawing of the record carrier. For clarity reasons, the tracks on the record carrier 42 are shown in a vertical direction, although in reality, the tracks are recorded in a slant direction on the record carrier 42.

In the first recording mode, the processed SD video signal is supplied to the heads $H_1$ and $H_2$ and the heads record the processed SD video signals on the record carrier 42 so that tracks $T_1$, $T_2$, $T_3$, $T_4$, $T_5$, $T_6$, $T_7$, . . . are obtained. The odd-numbered tracks $T_1$, $T_3$, $T_5$, $T_7$, . . . have been recorded by the head $H_1$ with the azimuth angle $+\alpha$, and the even-numbered tracks $T_2$, $T_4$, $T_6$, . . . have been recorded by the head $H_2$ with the azimuth angle $-\alpha$.

The SD video signal applied to the input terminal 1 can be in the form of an MPEG transport stream comprising packets of information of the SD video signal.

In a second recording mode, an HD video signal is recorded on the record carrier 42. The HD video signal applied to the input terminal 1 can also be in the form of an MPEG transport stream comprising packets of information of the HD video signal. The record carrier is transported by a record carrier transport unit (not shown) with a velocity of 2 times $v_t$, and the rotatable head drum 36 is rotated with the same predetermined rotational velocity as in the first recording mode. In the second recording mode, the multiplexer unit 4 is controlled in such a way that an HD video signal received via the input 1 is split up into two signal components, a first and a second signal component that roughly have the same bit-rate. The first signal component is supplied to the input 10 of the first processing unit 12 and the second signal component is supplied to the input 20 of the second processing unit 22. In the specific embodiment where the HD video signal is in the form of an MPEG transport stream, the multiplexer unit 4 simply distributes the packets received at its input 2 to either its output 6 or to its output 8, resulting in the first and second signal components at its outputs 6 and 8, respectively.

The first processing unit 12 processes the first signal component again in a well-known way. When the first signal component is supplied in the form of MPEG packets in an MPEG transport stream, time stamps are added to the packets, and an error correction encoding and a channel encoding is carried out on the first signal component so as to obtain a processed first signal component suitable for recording on the record carrier. The second processing unit 22 processes the second signal component in the same well-known way. When the second signal component is supplied in the form of MPEG packets in an MPEG transport stream, time stamps are added to the packets, and an error correction encoding and a channel encoding is carried out on the second signal component so as to obtain a processed second signal component suitable for recording on the record carrier.

Figure 4:
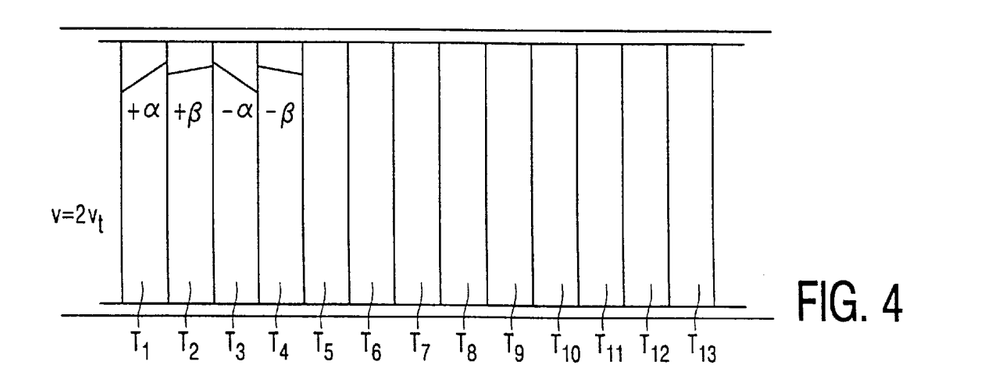
FIG. 4 shows the track pattern on the record carrier obtained with the recording apparatus switched into the second recording mode.

FIG. 4 shows the record carrier 42 obtained after the processed first and second signal components in the second recording mode have been recorded. FIG. 4 is again only a schematic drawing of the record carrier. For clarity reasons, the tracks on the record carrier 42 are again shown in a vertical direction, although in reality, the tracks are recorded in a slant direction on the record carrier 42.

In the second recording mode, the processed first signal component is supplied to the heads $H_1$ and $H_2$ and the heads record the processed first signal component on the record carrier 42 so that tracks $T_1, T_3, T_5, T_7, T_9, T_{11}, T_{13}, \ldots$ are obtained. The tracks denoted $T_1, T_5, T_9, T_{13}, \ldots$ have been recorded by the head $H_1$ with the azimuth angle $+\alpha$, and the tracks denoted $T_3, T_7, T_{11}, \ldots$ have been recorded by the head $H_2$ with the azimuth angle $-\alpha$. Further, the second processed signal component is supplied to the heads $H_3$ and $H_4$ and these heads record the processed second signal component on the record carrier 42 so that tracks $T_2, T_4, T_6, T_8, T_{10}, T_{12}, \ldots$ are obtained. The tracks denoted $T_2, T_6, T_{10}, \ldots$ have been recorded by the head $H_3$ with the azimuth angle $+\beta$, and the tracks denoted $T_4, T_8, T_{12}, \ldots$ have been recorded by the head $H_4$ with the azimuth angle $-\beta$.

Figure 5:
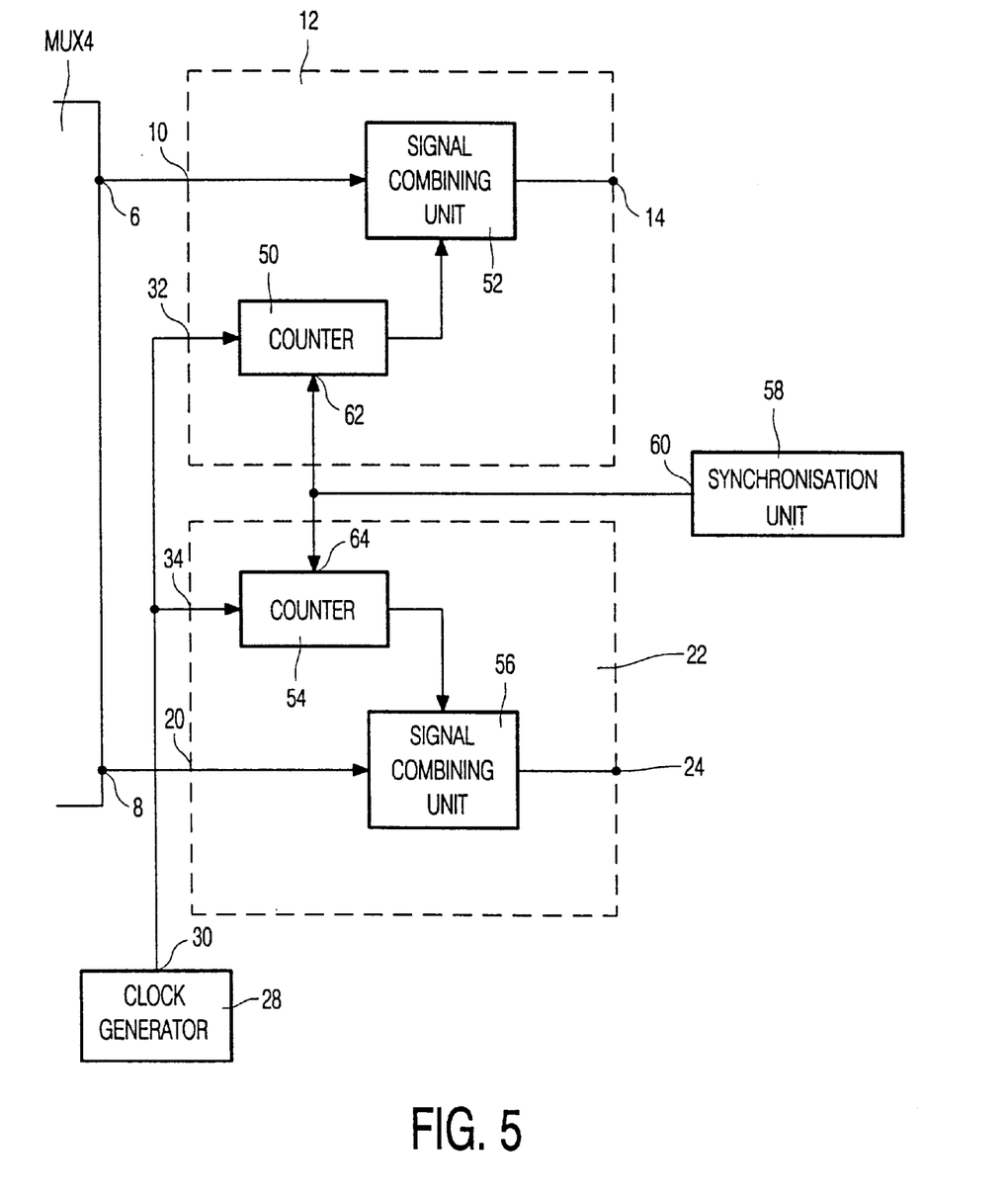
FIG. 5 shows a further elaboration of the first and second processing units in the apparatus of FIG. 1.

The processing of the packets in the MPEG datastream of the first or the second information signal supplied to the input 1 so as to obtain a processed information signal suitable for recording on the record carrier, has been extensively described in U.S. Pat. No. 5,579,183, document D3, and European Patent Application EP-A 763,238, document D4 in the List Of Related Documents. It is considered appropriate to explain the time stamp generation for the first and the second information signals in the processing units 12 and 22. Reference is made in this respect to FIG. 5.

In the first recording mode, packets of the first information signal are supplied to the processing unit 12. The processing unit 12 comprises a counter 50 and a signal combination unit 52. The counter 50 is a counter that counts up in response to a 27 MHz clock frequency, supplied by the clock generator 28. The count values supplied by the counter 50 to the signal combination unit 52 are the time stamps that are incorporated into the packets of the first information signal by the combination unit 52, one time stamp in each packet.

The generation of the time stamps using the 27 MHz clock signal generator 28 and the counter 50 is extensively explained in document D4. It should be noted in this respect that the time stamp counter 50 is synchronized to head drum.

After having added the time stamps to the packets, the datastream obtained is error correction encoded in an ECC encoder unit (not shown) and channel encoded in a channel encoding unit (not shown) so as to make the datastream suitable for recording.

As the apparatus comprises two identical processing units, also the processing unit 22 comprises a counter 54 and a signal combination unit 56. The counter 54 also receives the 27 MHz clock frequency supplied by the generator 28. The counter 54 generates count values in response to the clock frequency. The count values are supplied to the signal combination unit 56 as time stamps, for incorporation into packets.

In the second recording mode, the multiplexer unit 4 generates, in response to the second information signal supplied to its input, the first and second signal components that are supplied to its outputs 6 and 8, respectively. The processing unit 12 inserts the time stamps generated by the counter 50 into the packets included in the first signal component of the second information signal and further carries out the ECC encoding step and the channel encoding step, in the way described above for the first recording mode.

In an identical way, the signal combination unit 56 inserts the time stamps generated by the counter 54 into the packets of the second signal component of the second information signal and carries out an ECC encoding step and a channel encoding step so as to obtain a datastream suitable for recording. Also in the second recording mode, the time stamp counter 50 and the head drum are synchronized with each other.

In order to obtain the correct timing between the time stamps generated by the counters 50 and 54, a synchronization unit 58 is available. The synchronization unit 58 has an output 60 on which the synchronization signal is available, which is supplied to synchronization inputs 62 and 64 of the counters 50 and 54, respectively. In response to the synchronization signal, the counters 50 and 54 are synchronized to the same count value, e.g., upon the initialization of the system when switching the apparatus on, or upon switching the apparatus into the recording mode.

Figure 6:
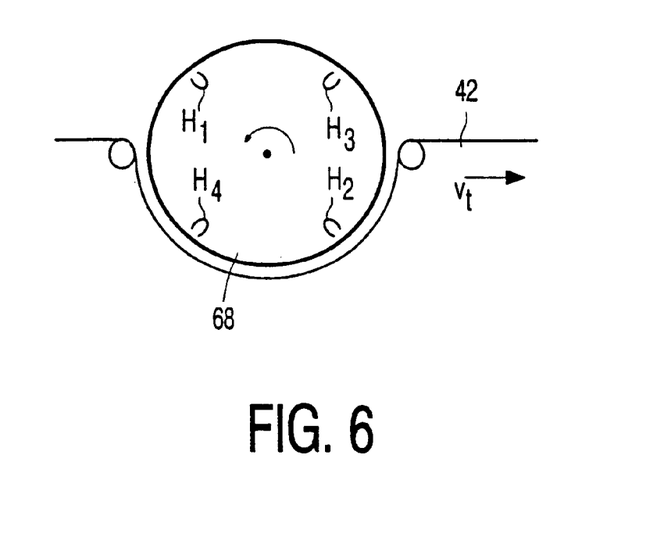
FIG. 6 shows the head drum of another embodiment of the recording apparatus.

FIG. 6 shows the rotatable head drum 68 of another embodiment of the recording apparatus. In this embodiment, the head drum 68 again has heads $H_1$, $H_2$, $H_3$ and $H_4$, positioned around the circumference of the head drum. The first head $H_1$ again has a head gap with an azimuth angle $+\alpha$, the second head $H_2$ again has a head gap with an azimuth angle $-\alpha$, the third head $H_3$ again has a head gap with an azimuth angle $+\beta$, and the fourth head $H_4$ again has a head gap with an azimuth angle $-\beta$. The heads $H_1$ and $H_2$ are again located diametrically opposite to each other at the periphery of the head drum. In the same way, again the heads $H_3$ and $H_4$ are located diametrically opposite to each other at the periphery of the head drum 36. The difference between the head drum 68 in FIG. 6 and the head drum 36 in FIG. 2 is that the head pair H3,H4 in FIG. 6 is rotated over nearly 90° compared to the position of the head pair $H_3,H_4$ in FIG. 2. Further, the heads of the head drum of FIG. 6 are positioned at the same height on the head drum.

The embodiment of the recording apparatus provided with the head drum of FIG. 6 results in the same track pattern as shown in the FIGS. 3 and 4.

As regards the error correction encoding on the information to be recorded, the following can be said. As explained above, an error correction encoding step can be carried out on the first information signal in the processing unit 12, in the first recording mode. In the error correction encoding step, a block of data of the first information signal is first subjected to a 'vertical' error correction encoding step, or outer error correction encoding, resulting in vertical (or outer) parities, and subsequently subjected to a 'horizontal' error correction encoding step, or inner error correction encoding, resulting in horizontal (or inner) parities. The error correction encoded datablock thus obtained is recorded in a number of e.g., 6 tracks, such as the tracks $T_1$ to $T_6$.

In the second recording mode, the processing unit 12 carries out an error correction encoding step on datablocks of the first signal component, resulting in error correction encoded datablocks of the first signal component. Further, the processing unit 22 carries out an error correction encoding step on datablocks of the second signal component, resulting in error correction encoded datablocks of the second signal component. Now, an error correction encoded datablock of the first signal component is recorded in the six tracks $T_1, T_3, T_5, T_7, T_9$ and $T_{11}$ and an error correction encoded datablock of the second signal component is recorded in the six tracks $T_2, T_4, T_6, T_8, T_{10}$ and $T_{12}$. Thus, a combed structure of the ECC blocks on the record carrier is obtained.

This has the advantage of using two recording ICs in parallel, without the need of a large internal memory in the ICs.

Figure 7:
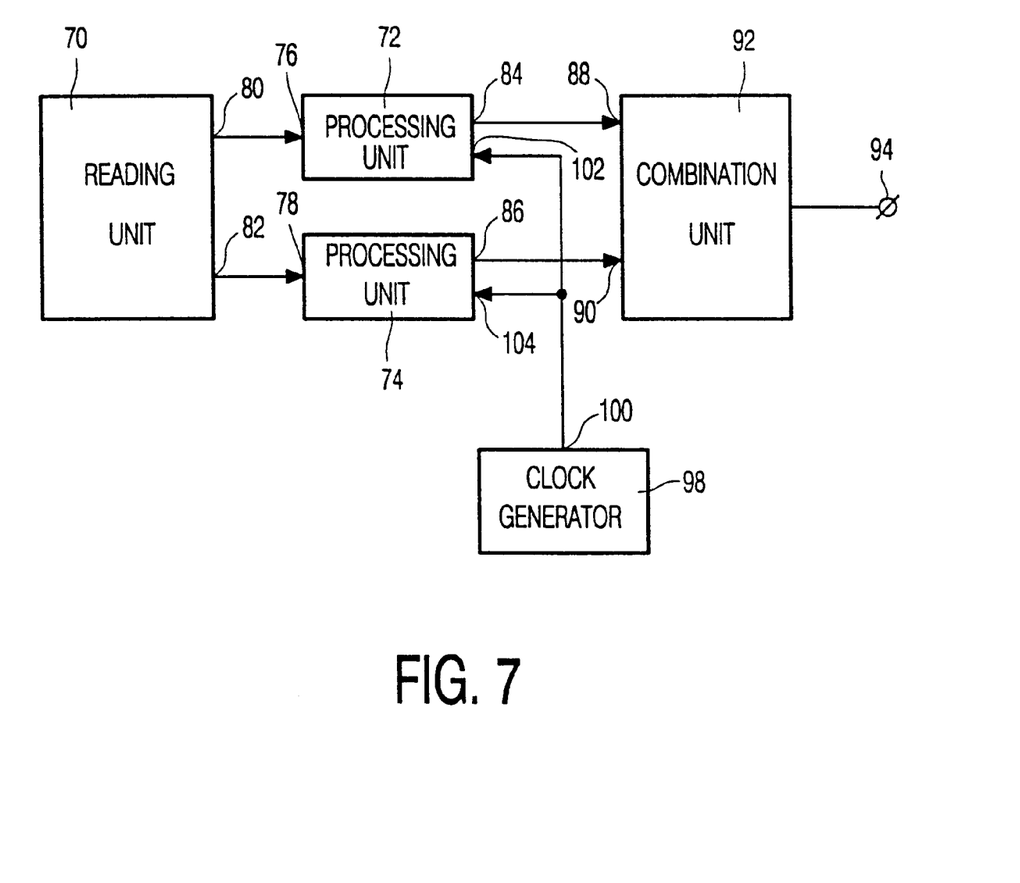
FIG. 7 shows an embodiment of the reproducing apparatus.

FIG. 7 shows an embodiment of the reproduction apparatus in accordance with the invention. The reproduction apparatus comprises a reading unit 70 for reading the processed first information signal or the processed second information signal in a first and a second reproducing mode, respectively. The apparatus further comprises processing units 72 and 74 having inputs 76 and 78, respectively, coupled to outputs 80 and 82, respectively, of the reading unit 70. Outputs 84 and 86 of the processing units 72 and 74, respectively, are coupled to corresponding inputs 88 and 90, respectively, of a signal combination unit 92, which has an output coupled to an output terminal 94 of the reproduction apparatus. The apparatus further comprises a clock signal generator 98, which has an output 100 coupled to clock inputs 102 and 104 of the processing units 72 and 74, respectively.

The reading unit 70 comprises a rotatable head drum provided with a plurality of heads, such as the head drum configuration shown in FIG. 2 or 6.

Figure 8:
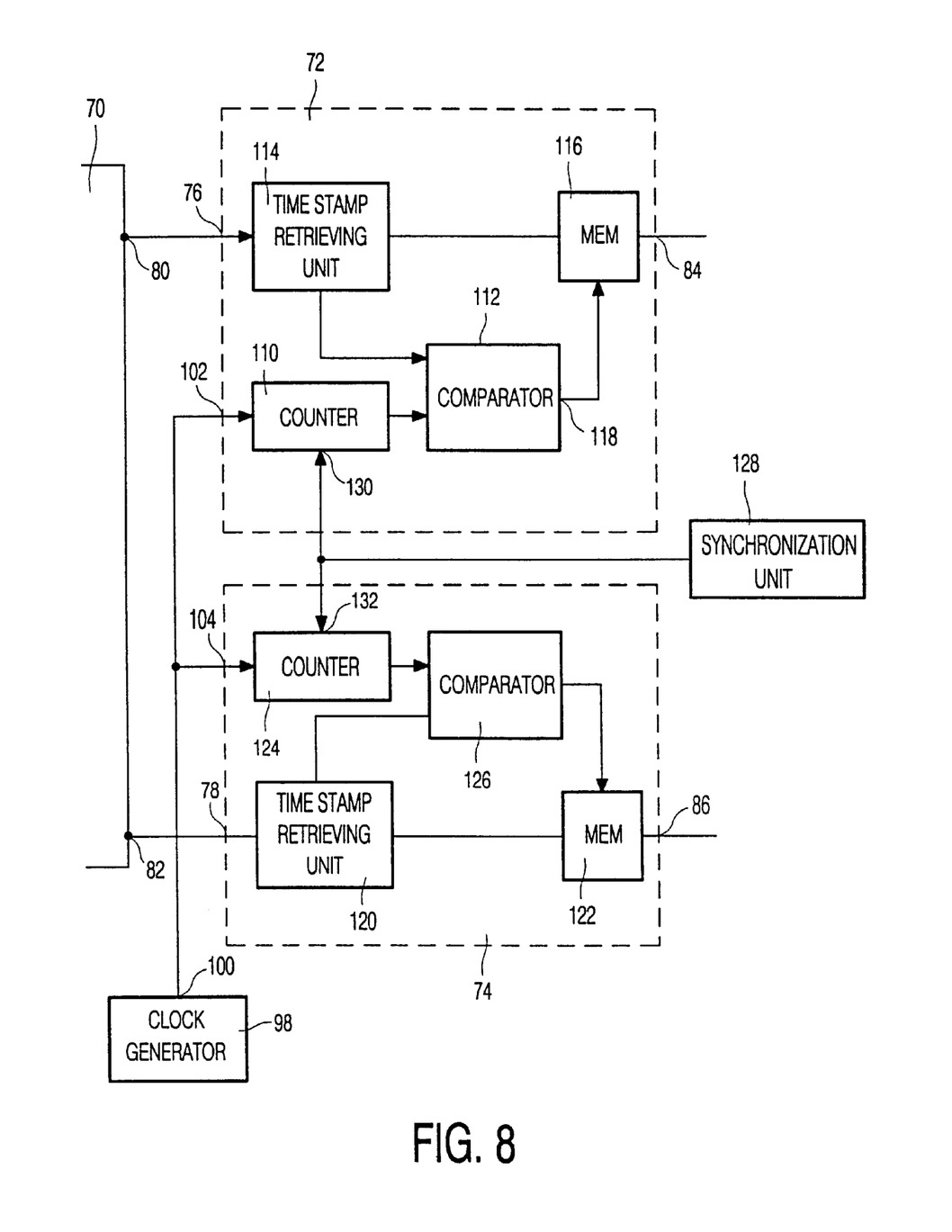
FIG. 8 shows a further elaboration of the first and second processing units in the apparatus of FIG. 7.

In the first reproduction mode of the apparatus of FIG. 8, the heads $H_1$ and $H_2$ read the information from the tracks $T_1$, $T_2$, $T_3$, ... on the record carrier of FIG. 3. The record carrier 42 is transported with the velocity $v_r$. The processed first information signal read by the heads $H_1$, $H_2$ is supplied to the output 80 and thus supplied to the processing unit 72. A processing step, inverse to the processing step during recording, is carried out on the processed first information signal. That is: a channel decoding step and an error correction step is carried out on the processed first information signal, so as to obtain a replica of the first information signal. The time stamps included in the packets in the replica of the first information signal are retrieved therefrom and compared with time stamps generated in the processing unit 72, so as to determine the exact time instant at which a packet should be outputted to the combination unit 92. The signal combination unit 92 does nothing more than unmodified transfer of the first information signal regenerated to the output terminal 94.

In the second reproduction mode, the record carrier is transported with the velocity $2.v_r$. The heads $H_1$ and $H_2$ read the information recorded in the tracks $T_1$, $T_3$, $T_5$, ..., and the heads $H_3$ and $H_4$ read the information recorded in the tracks $T_2$, $T_4$, $T_6$, ..., see FIG. 4. The processed first signal component of the second information signal is thus read by the heads $H_1$, $H_2$ and supplied to the output 80 of the reading unit 70. The processed second signal component of the second information signal is thus read by the heads $H_3$, $H_4$ and supplied to the output 82 of the reading unit 70.

The processed first signal component is processed in the processing unit 72 in the way described above. The processed second signal component is processed in the processing unit 74 in an inverse way compared to the processing in the processing unit 22 of FIG. 1. That is: a channel decoding step and an error correction step is carried out on the processed second signal component, so as to obtain a replica of the second signal component. The time stamps included in the packets in the replica of the second signal component are retrieved therefrom and compared with time stamps generated in the processing unit 74, so as to determine the exact time instant at which a packet should be outputted to the combination unit 92. The signal combination unit 92 combines the packets supplied by the processing units 72 and 74 into a single serial datastream of the second information signal which is supplied to the output terminal 94. Because of the correct timing synchronization, the packets in the first and second signal components will be supplied at such time instants to the combination unit 92 that they can be merged so as to obtain the serial datastream of the second information signal.

The processing in the processing units 72 and 74 will be further explained with reference to FIG. 8.

In the first reproducing mode, packets comprised in the processed first information signal are supplied to the input 76 of the processing unit 72. The processing unit 72 comprises a channel decoder unit (not shown) for channel decoding the datastream received via the input 76, in a way inverse to the channel encoding step carried out in the processing unit 12 of the recording apparatus. Further, the processing unit 72 comprises an error correction unit (not shown) for carrying out an error correction on the channel decoded information. The processing unit 72 further comprises a time stamp retrieval unit 114, a memory unit 116, a counter 110 and a comparator unit 112. The time stamp retrieval unit 114 retrieves the time stamps from the packets in the datastream supplied to the retrieval unit and supplies the time stamps to the comparator unit 112, and supplies the packets to the memory unit 116 in which they are stored for later retrieval. The counter 110 is a counter that counts up in response to a 27 MHz clock frequency, supplied by the clock generator 98. The count values supplied by the counter 110 to the comparator unit 112 are compared in the comparator unit 112 with the time stamps supplied by the retrieval unit 114. Upon coincidence of a count value with a time stamp, the comparator unit 112 supplies a control signal at its output 118, this control signal being supplied to the memory 116. In response to this control signal, the memory 116 supplies the packet corresponding to the time stamp for which a coincidence with the count value was established, to the output 84 of the processing unit 72.

As the apparatus comprises two identical processing units, also the processing unit 74 comprises a time stamp retrieval unit 120, a memory unit 122, a counter 124 and a comparator unit 126. The retrieval unit 120 again retrieves the time stamps from the packets supplied to its input and supplies the packets to the memory unit 122 for storage therein for later retrieval. The counter 124 also receives the 27 MHz clock frequency supplied by the generator 98. The counter 124 generates count values in response to the clock frequency. The count values are supplied to the comparator unit 126.

In the second reproduction mode, the reading unit 70 supplies the processed first and second signal components to the inputs 76 and 78, respectively, of the first and second processing units 72 and 74, respectively. The processing unit 72 processes the processed first signal component in the way described above for the first reproducing mode. In an identical way, the processing unit 74 processes the processed second signal component.

In order to obtain the correct timing between the time stamps generated by the counters 110 and 124, a synchronization unit 128 is available. The synchronization unit 128 has an output on which the synchronization signal is available, this synchronization signal being supplied to synchronization inputs 130 and 132 of the counters 110 and 124, respectively. In response to the synchronization signal, the counters 110 and 124 are synchronized to the same count value.

As a result, packets are supplied by the memory units 116 and 122 such that they do not overlap in time and can be merged precisely into a serial datastream by the combination unit 92.

While the invention has been described with reference to preferred embodiments thereof, it is to be understood that these are not limitative examples. Thus, various modifications may become apparent to those skilled in the art, without departing from the scope of the invention, as defined by the claims. One of the advantages of the recording apparatus in accordance with the invention, is that the recorded signal recorded in the first recording mode can be read by a prior art reproducing apparatus provided with only the heads $H_1$ and $H_2$ on the head drum. This has the further advantage that, new features that are scanner dependent and/or tape format dependent, such as the trick play proposal as described in U.S. Pat. No. 6,222,881, corresponding to European Patent Application No. 97200278.6 (PHN 16614), document D5 in the List Of Related Documents, can be added to the recording/reproduction system without any problem.

Further, the invention lies in each and every novel feature or combination of features.

RELATED DOCUMENTS (D1) U.S. Pat. Nos. 5,937,137, 6,055,358 and 6,246,830 corresponding to published International Patent Application No. WO 96/06426 (PHO 94.513).

(D2) U.S. Pat. No. 5,412,515, and 5,495,369 corresponding to European Patent Application No. EP 346,973 (PHN 12.599).

(D3) U.S. Pat. No. 5,579,183, corresponding to EP-A 702,877 (PHN 14.818).

(D4) U.S. Pat. No. 5,953,483, corresponding to EP-A 763.238 (PHN 15.260).

(D5) U.S. Pat No. 6,222,981, corresponding to European Patent Application No. 97200278.6 (PHN 16614).

What is claimed is:

1. Apparatus for recording a first information signal with a first bit-rate in a first recording mode or a second information signal with a second bit-rate in a second recording mode so as to produce slant tracks on a magnetic record carrier, the apparatus comprising:
    input means for receiving the first or the second information signal;
    processing means for processing the first or the second information signal to produce a processed first or second information signal, respectively;
    writing means for writing the processed first or second information signal in said first and second recording modes, respectively, to produce said slant tracks; and
    transporting means for transporting the record carrier with a first or a second record carrier speed in said first and second recording modes, respectively, the second record carrier speed being larger than the first record carrier speed, and the second bit-rate being higher than the first bit-rate,
wherein the processing means comprises:
    a multiplexer coupled to receive said first or said second information signal, said multiplexer, in said first recording mode, passing said first information signal to a first output, and, in said second recording mode, multiplexing said second information signal into a first signal component for application to said first output and a second signal component for application to a second output;
    a first processing unit coupled to said first output of said multiplexer for processing the first information signal, in said first recording mode, to form said processed first information signal for recording, the first processing unit further processing the first signal component into a processed first signal component in said second recording mode; and
    a second processing unit coupled to the second output of the multiplexer for processing the second signal component into a processed second signal component in said second recording mode,
wherein the writing means comprises:
    at least one pair of a first and a second write head having azimuth angles substantially equal to +α and −α, respectively; and
    at least one pair of a third and a fourth write head having azimuth angles substantially equal to +β and −β, respectively, β being unequal to α,
and wherein the writing means writes, in said first recording mode, the processed first information signal on said record carrier using said at least one pair of the first and second write head, and the writing means further writes, in said second recording mode, said processed first signal component on said record carrier using said at least one pair of the first and second write head, and said processed second signal component on said record carrier using said at least one pair of the third and fourth write head.

2. Apparatus as claimed in claim 1, wherein the first information signal and the second information signal comprise subsequent packets of information of the first and second information signals, respectively, and wherein the processing means further comprises time stamp generator means for generating time stamps for insertion in said packets.

3. Apparatus as claimed in claim 2, wherein said time stamp generator means comprises a first and a second time stamp generator unit, the first time stamp generator unit being comprised in said first processing unit and the second time stamp generator unit being comprised in said second processing unit, the first and second time stamp generator unit each comprising a counter for generating count values as the time stamps, and the apparatus comprising synchronizing means for synchronizing counters in said first and second time stamp generator units, respectively, so that said counters have the same count value.

4. Apparatus as claimed in claim 3, wherein the apparatus further comprises clock signal generator means for generating a clock signal for both of said counters.

5. Apparatus as claimed in claim 1, wherein the first processing unit is substantially identical to the second processing unit.

6. Apparatus as claimed in claim 1, wherein the first and second information signals are MPEG encoded signals comprising packets of information.

7. Apparatus as claimed in claim 2, wherein the multiplexer unit allocates packets in the second information signal to either the first or the second processing unit in said second recording mode.

8. Apparatus as claimed in claim 1, wherein the writing means comprises one pair of the first and second write head and one pair of the third and fourth write head, and wherein the second record carrier speed is twice the first record carrier speed.

9. Apparatus for reproducing a first information signal with a first bit-rate in a first reproducing mode or a second information signal with a second bit-rate in a second reproducing mode to form a reproduced first information signal or a reproduced second information signal, respectively, from slant tracks on a record carrier, the apparatus comprising:
    reading means for reading a processed first information signal or a processed second information signal from said slant tracks, in said first and second reproducing modes, respectively;

processing means for processing the processed first information signal or the processed second information signal to form said reproduced first and second information signals, respectively;

transporting means for transporting the record carrier with a first or a second record carrier speed in said first and second reproducing modes, respectively, the second record carrier speed being larger than the first record carrier speed, and the second bit-rate being higher than the first bit-rate; and output means for supplying said reproduced first information signal or said reproduced second information signal in said first and second reproducing modes, respectively, wherein the reading means comprises:

at least one pair of a first and a second read head, having azimuth angles substantially equal to +α and −α, respectively; and at least one pair of a third and a fourth read head having azimuth angles substantially equal to +β and −β, respectively, β being unequal to α, wherein the reading means reads, in said first reproducing mode, the processed first information signal from said record carrier using said at least one pair of the first and second read head, and the reading means further reads, in said second reproducing mode, said processed second information signal in the form of a processed first signal component from said record carrier using said at least one pair of the first and second read head, and a processed second signal component from said record carrier using said at least one pair of the third and fourth read head, and wherein the processing means comprises:

first processing unit for processing the processed first information signal read from the record carrier to form said reproduced first information signal in said first reproducing mode, and for processing the first processed signal component into a reproduced first processed signal component in said second reproducing mode;

a second processing unit for processing the second processed signal component into a reproduced second signal component in said second reproducing mode; and a combination unit for combining the reproduced first and second signal components into said reproduced second information signal in said second reproducing mode.

10. Apparatus as claimed in claim 9, wherein the processed first information signal and the processed second information signal comprise subsequent packets of information of the first and second information signals, respectively, said packets comprising a time stamp, and wherein the processing means further comprises:

retrieval means for retrieving said time stamps from said packets;

time stamp generator means for generating time stamps; and comparator means for comparing said time stamps generated by said time stamp generator means with the time stamps retrieved from the packets, said comparator means generating a control signal upon coincidence of said generated and retrieved time stamps, the combination unit combining said packets into said reproduced first or second information signal, in response to said control signal.

11. Apparatus as claimed in claim 10, wherein said time stamp generator means comprises a first and a second time stamp generator unit comprised in said first and second processing units, respectively, the first and second time stamp generator units each comprising a counter for generating count values as the time stamps, wherein the apparatus further comprises synchronizing means for synchronizing the counters in both of said first and second time stamp generator units so that said counters have the same count value, and wherein, in said second reproducing mode, the combination unit combines the packets supplied by said first and second processing units into said reproduced second information signal, in response to said control signal.

12. Apparatus as claimed in claim 11, wherein the apparatus further comprises clock signal generator means for generating a clock signal for said counters.

13. Apparatus as claimed in claim 9, wherein the reading means comprises one pair of the first and second read head and one pair of the third and fourth read head, and wherein the second record carrier speed is twice the first record carrier speed.

14. Apparatus as claimed in claim 9, wherein the first processing unit is substantially identical to the second processing unit.

15. Apparatus as claimed in claim 9, wherein the reproduced first and second information signals are MPEG encoded signals comprising packets of information.

16. Apparatus as claimed in claim 10, wherein the combination unit merges the packets in the reproduced first and second signal components into one serial datastream to form said reproduced second information signal in said second reproducing mode.

17. Method of recording a first information signal in a first recording mode or a second information signal in a second recording mode so as to produce slant tracks on a magnetic record carrier, the method comprising the steps:

receiving the first information signal or the second information signal;

processing the first or the second information video signal to produce a processed first or second information signal, respectively;

writing the processed first or second information signal in said first and second recording modes, respectively, to produce said slant tracks; and transporting the record carrier with a first or a second record carrier speed in said first and second recording modes, respectively, the second record carrier speed being larger than the first, wherein the processing step comprises the substeps:

multiplexing the second information signal into a first signal component and a second signal component in said second recording mode;

first processing substep of processing the first information signal in said first recording mode, or processing the first signal component into a processed first signal component in said second recording mode; and a second processing substep of processing the second signal component into a processed second signal component in said second recording mode, wherein the writing step comprises writing signals with at least one pair of a first and a second write head, having azimuth angles substantially equal to +α and −α, respectively, and with at least one pair of a third and a fourth write head having azimuth angles substantially equal to +β and −β, respectively, where β is unequal to α, in which the writing step comprises writing, in said first recording mode, the processed first information signal on said record carrier using said at least one pair of the first and second write head, and writing, in said second recording mode, said processed first signal component on said record carrier using said at least one pair of the first and second write head, and said processed second signal component on said record carrier using said at least one pair of the third and fourth write head.

* * * * *